United States Patent [19]

Presta

[11] 4,054,438
[45] Oct. 18, 1977

[54] METHOD AND APPARATUS FOR CURVING SHEETS IN THE PLASTIC STATE

[75] Inventor: Claude Presta, Courbevoie, France

[73] Assignee: Saint-Gobain Industries, Neuilly-sur-Seine, France

[21] Appl. No.: 690,038

[22] Filed: May 25, 1976

[30] Foreign Application Priority Data

May 30, 1975 France ............................ 75.16935

[51] Int. Cl.² ............................................. C03B 23/02
[52] U.S. Cl. ..................................... 65/107; 65/104; 65/273; 65/285
[58] Field of Search ............... 65/104, 107, 273, 275, 65/285

[56] References Cited

U.S. PATENT DOCUMENTS

| 3,223,501 | 12/1965 | Fredley et al. ............... 65/182 A X |
| 3,545,951 | 12/1970 | Nedelec ............................ 65/104 |
| 3,801,298 | 4/1974 | Bezombes ....................... 65/104 |

*Primary Examiner*—Arthur D. Kellogg
*Attorney, Agent, or Firm*—Pennie & Edmonds

[57] ABSTRACT

The sheet to be curved, such as glass at a softening temperature, is advanced on a fixed curved bed formed by a series of curved rods having angles of inclination which provide the bed with an increasing curvature profile. The edges of the sheet gradually sag as the sheet advances. The curved bed is followed by a bed having a constant profile formed by curved rods having the same inclination. The peaks of the rods advantageously lie in a straight line. Means are provided for simultaneously changing the inclinations of the curved rods when sheets of a different curvature are to be made.

20 Claims, 5 Drawing Figures

METHOD AND APPARATUS FOR CURVING SHEETS IN THE PLASTIC STATE

The present invention relates to the bending or curving of sheets of material in the plastic state such as sheets of glass brought to softening temperature.

It is known from U.S. Pat. No. 3,545,951 to use as a bending or curving form a series of curved rods capable of pivoting about respective axes passing through their two ends and situated in the same horizontal plant. Each of these rods is rigidly connected to a crank arm and the various arms are connected to a common control bar. The rods thus form a bed which is increasingly curved as the rods are raised higher by means of the control bar. In addition, each rod is enclosed in a sleeve which is flexible to allow bending but possesses torsional strength and which is rotationally driven, thus causing the sheets of glass to be advanced. As the tangential velocities of these sleeves have the same value at all points, no disturbing sticking problems occur during displacement of the sheets.

The curving or bending operation is carried out in the following manner. The curved rods are initially oriented in the horizontal plane of their pivoting axes, and receive the sheet which is advanced in this plane by a conveyor. Then the control bar is displaced in a translational movement and, by means of cranks, simultaneously pivots the curved rods so as to bring them into an inclined position with respect to the plane of advancement which corresponds to the desired curvature to be imparted to the sheet of glass, this position being maintained by the action of a jack.

When the bed is no longer flat, the sheet of glass at a softening temperature sags under its own weight or under the pressure of a regulatable counterform, and adopts the new shape provided by the rods. It is thus possible to obtain sheets having a desired degree of curvature, the maximum curvature being obtained when all the rods are turned to a right angle with respect to their original horizontal orientation. The sheet of glass is then advanced to a cooling unit where it sets, cooling possibly being carried out rapidly so that the glass is simultaneously subjected to a thermal tempering step.

As soon as the sheet of glass has left each of the curved rod of the installation, this curved rod is returned to the plane of advancement of the conveyor so that the operating cycle can be immediately repeated on a fresh sheet of glass.

When a counterform is used, it is movable in translation and its displacement is synchronized with the rotation of the sleeves. As a result, it is still possible for the curving operation to be effected without interrupting the advancement of the sheets. The use of a counterform makes it possible to operate at a lower temperature and thus obtain a higher quality product without reducing the rate of manufacture. However, the apparatus is fairly complicated and requires accurate regulation.

Whatever the mode of operation employed, one of the important advantages is that a single apparatus can be used to provide sheets of glass with different degrees of curvature simply by varying the degree of inclination of the curved rods with respect to the horizontal plane of advancement.

A principal object of the present invention is to simplify the above described curving process and apparatus, while retaining the advantages thereof.

In accordance with the invention, in the curving zone the sheets to be curved are advanced on a stationary curved bed formed by a series of curved rods adjusted at predetermined angles of inclination to provide the bed with a curved profile which increases from the initial horizontal plane of the conveyor to a maximum curvature corresponding to the final desired curvature of the sheet.

By virtue of this mode of operation, the angle of inclination of each rod is fixed once and for all for a particular manufacturing operation and it is not changed during this operation. As a result, mechanical control means are not required for constantly pivoting the curved rods and then returning them to the plane of the conveyor. Advantageously all the curved rods have the same degree of curvature, and their angles of inclination are selected to progressively produce the desired shape. However, if desired the curvature of the rods can also be increased from the input to the output.

As a general rule, it is preferably to orient the tips of the rods in the upstream direction of the apparatus and to incline them with respect to the horizontal so as to gradually produce a convex bed.

Advantageously, in accordance with the present invention, the tips or peaks of the curved rods are maintained on a predetermined straight line, preferably a horizontal line. In order to allow changing the apparatus in order to produce sheets of different curvature, means are provided for simultaneously changing the angles of inclination of the curved rods to change the increasing curvature profile of the curved bed, while maintaining the peaks in a straight line. Such means may comprise a pivotably mounted frame in which the end sections of the curved rods are mounted with their axes of rotation disposed in a downwardly extending plane. Control cranks are affixed with the end sections of the rods and fixed reference support means guides the ends of the crank arms. Means are provided for changing the inclination of the frame with respect to the reference means. Advantageously the lengths of the crank arms are equal to the distances of the peaks of the curved rods from the axes thereof. Preferably the frame is pivotable about a horizontal axis fixed with respect to the supply of glass sheets, etc., to be curved.

According to a further feature of the invention, the sheets of glass, after passing through the curving zone formed by a bed whose profile changes gradually, are advanced on a bed having a constant profile formed by a further series of curved rods which are all inclined at the same angle which corresponds to the final desired degree of curvature. It is thus possible to stabilize the shape of the sheet and to avoid any risk of subsequent deformation prior to completion of the operation of setting the glass by cooling it.

Advantageously the further series of rods are mounted on a horizontal second frame which is pivotally hinged to the lower end of the first frame. Then, by raising or lowering the second frame, the angles of inclination of the rods on the first frame may be simultaneously changed, while maintaining the further series of rods in proper relationship to receive the curved sheets from the first series.

Other objects, features and advantages of the new process and the apparatus for implementing the same will be made apparent in the course of the following detailed description thereof with reference to the accompanying drawings, in which.

Figure 1:
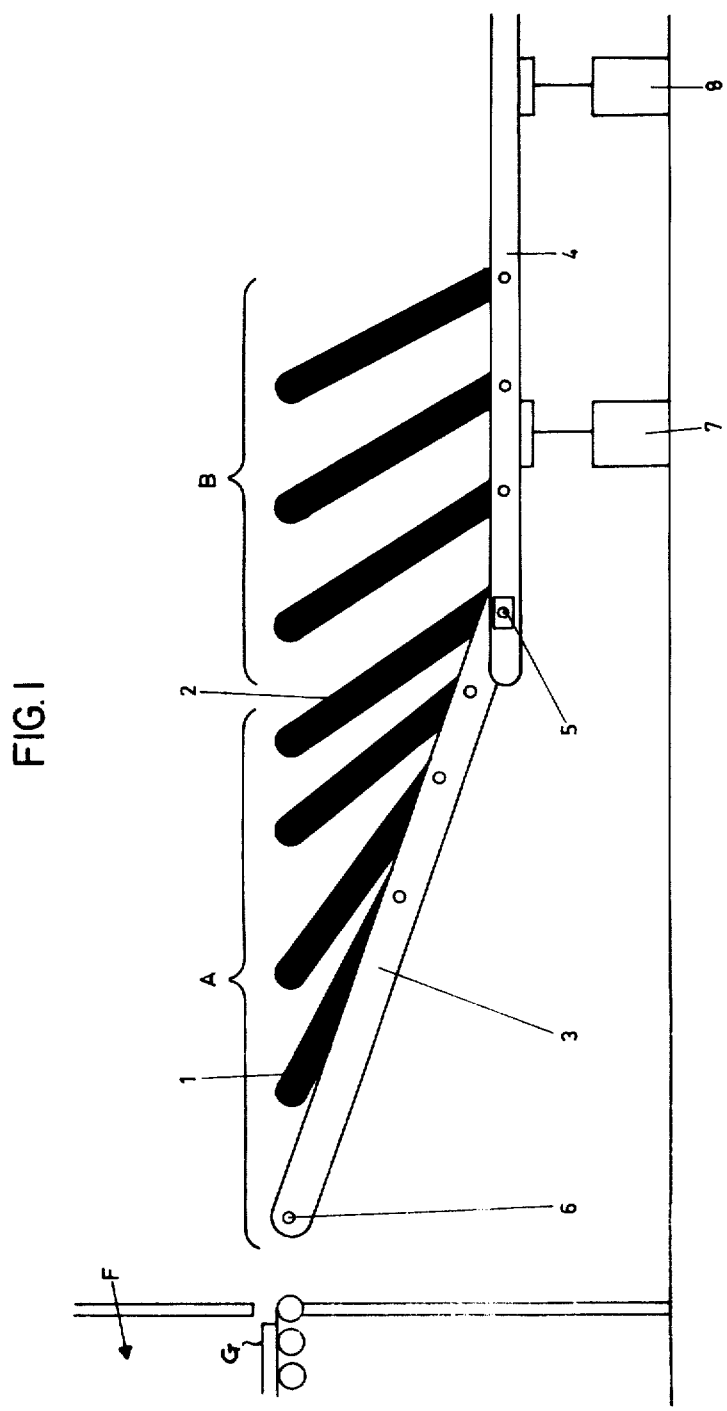
FIG. 1 is a diagrammatic side view of the curving apparatus.

Referring to FIG. 1, the curved rods are shown in position ready to receive a sheet of material in the plastic state in order to bend it to a given curvature. A glass sheet G heated to softening temperature may be advanced by driven rollers in furnace F. All of the curved rods have the same curved shape.

The first series of curved rods situated in zone A are each oriented in a different direction. The plane of rod 1 is slightly inclined, semi-horizontal, whereas each of the succeeding rods is in a different position, each one being slightly more inclined until a maximum inclination is reached in the case of the rod 2. Rod 2, having this maximum inclination, provides the desired curvature. From rod 2 onwards, the succeeding rods in zone B are all disposed in planes having this maximum inclination. As is apparent, all the peaks of the rods are at the same level, this level being that at which the upstream device, the over F in the case of a sheet of glass, supplies the sheet to be curved. The curved rods are encircled by flexible tubular sleeves having torsional strength, with pinions 25 attached to the ends thereof and driven by chains 26 to advance the sheet along the bed formed by the curved rods.

The rods in zone A are mounted at their ends in parallel beams 3, only one of which is visible in FIG. 1, and the rods in zone B are mounted in two parallel beams 4. Beams 3 form a frame which is pivotally attached at its lower end to the frame formed by beams 4, as indicated at 5. The pivots 5 coincide with the axis of rotation of curved rod 2, and are mounted in beams 4 to allow a certain amount of longitudinal movement in beams 4. The beams 3 are pivoted about a transverse axis 6 situated at the input of the curving apparatus, and therefore at the output of the oven or upstream device. The inclination of the frame formed by beams 3, with respect to the horizontal, may be changed by lowering or raising the jacks 7 and 8, which support the frame formed by beams 4. The beams 4, per se, always remain horizontal and are both at the same level.

When the beams 4 are lowered, the beams 3 pivot about the axis 6, and simultaneously the planes of the curved rods are adjusted by a mechanism which will be described later in such a manner that their tips or peaks remain at the level of the oven discharge or of the upstream apparatus for supplying the sheet to be curved.

Figure 2:
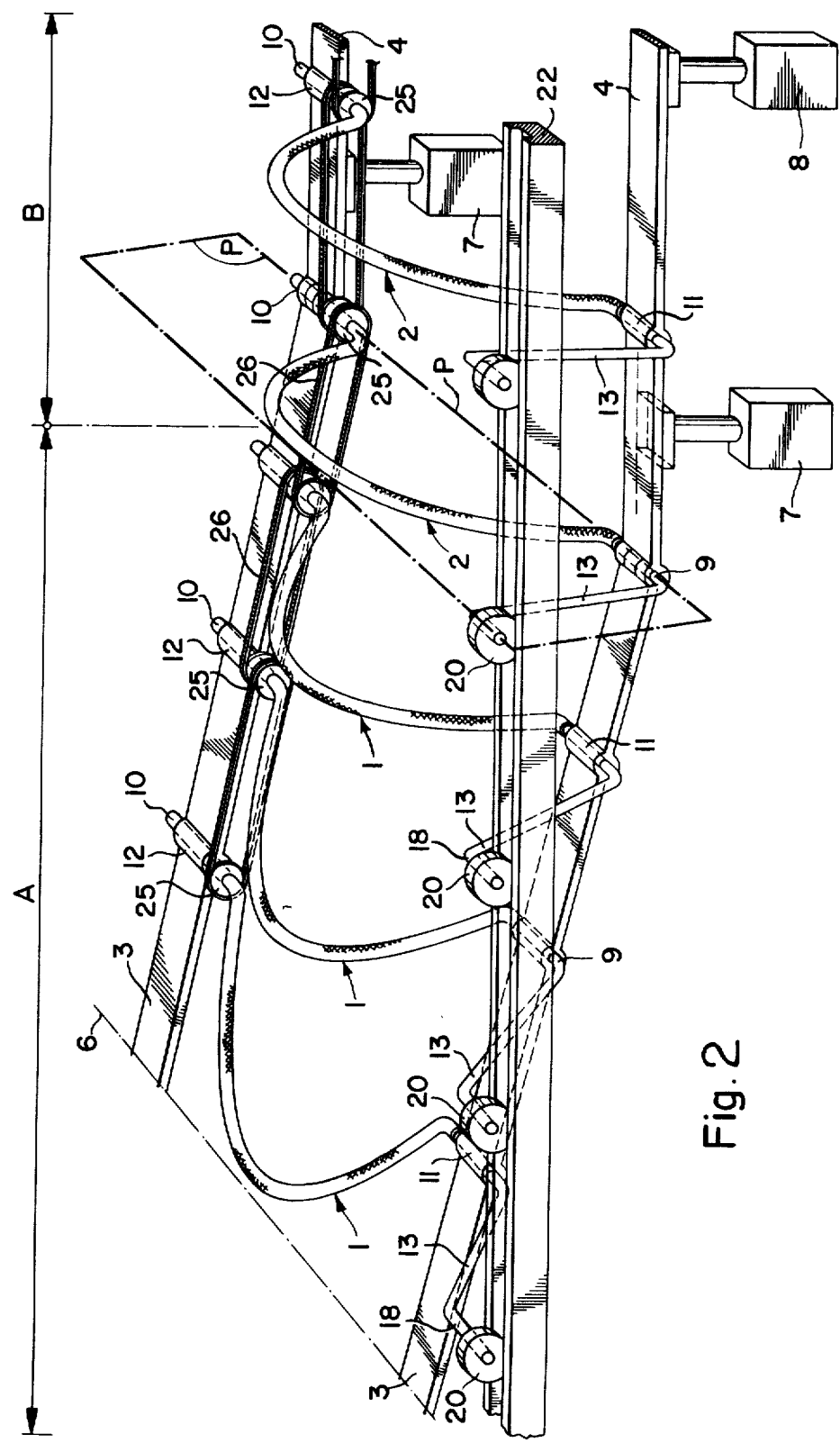
FIG. 2 is a diagrammatic perspective view of the apparatus of FIG. 1.
Figure 3:
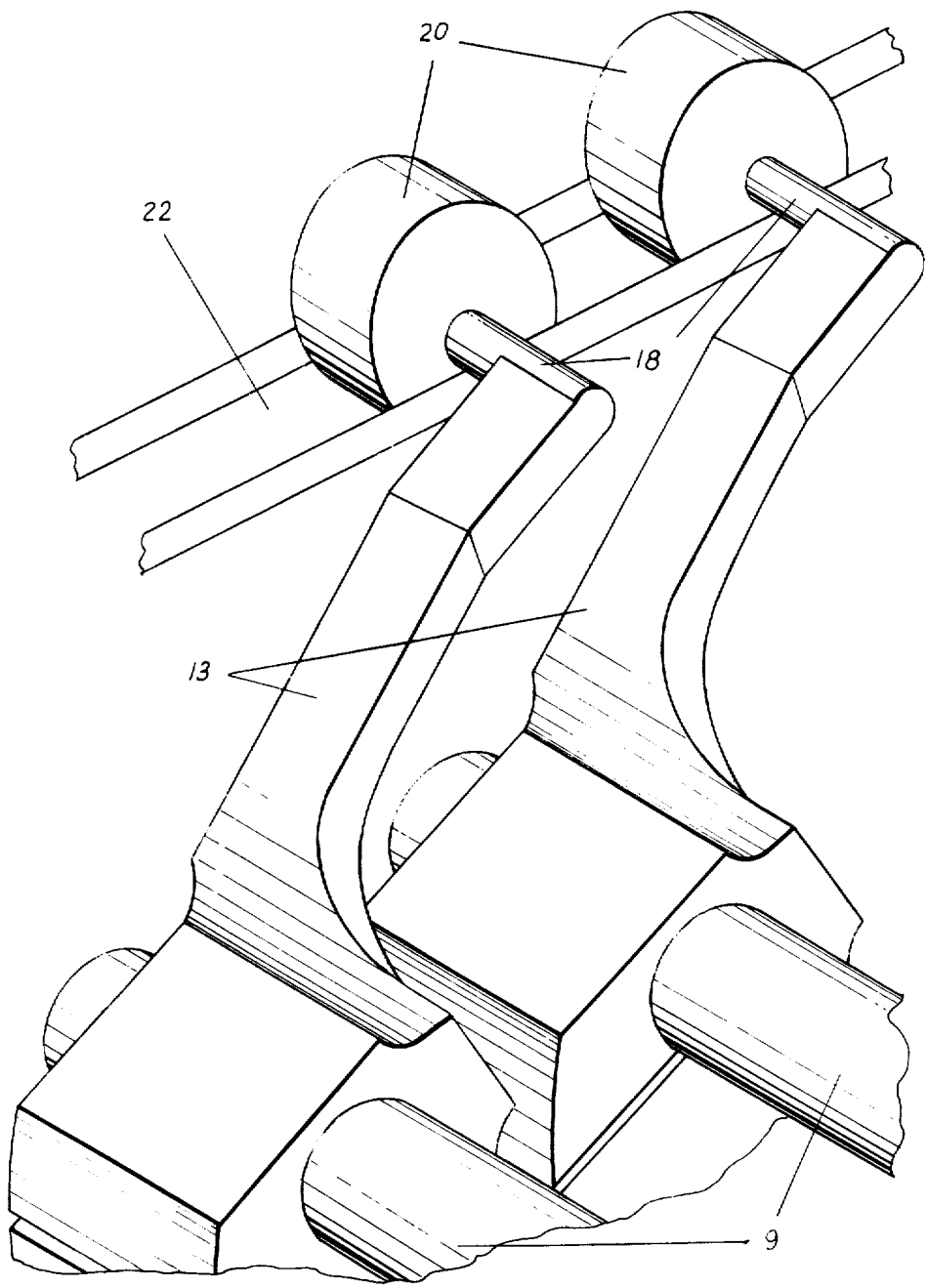
FIG. 3 is a perspective view of the crank arms and associated means for controlling the angles of inclination of the curved rods of FIGS. 1 and 2.
Figure 4:
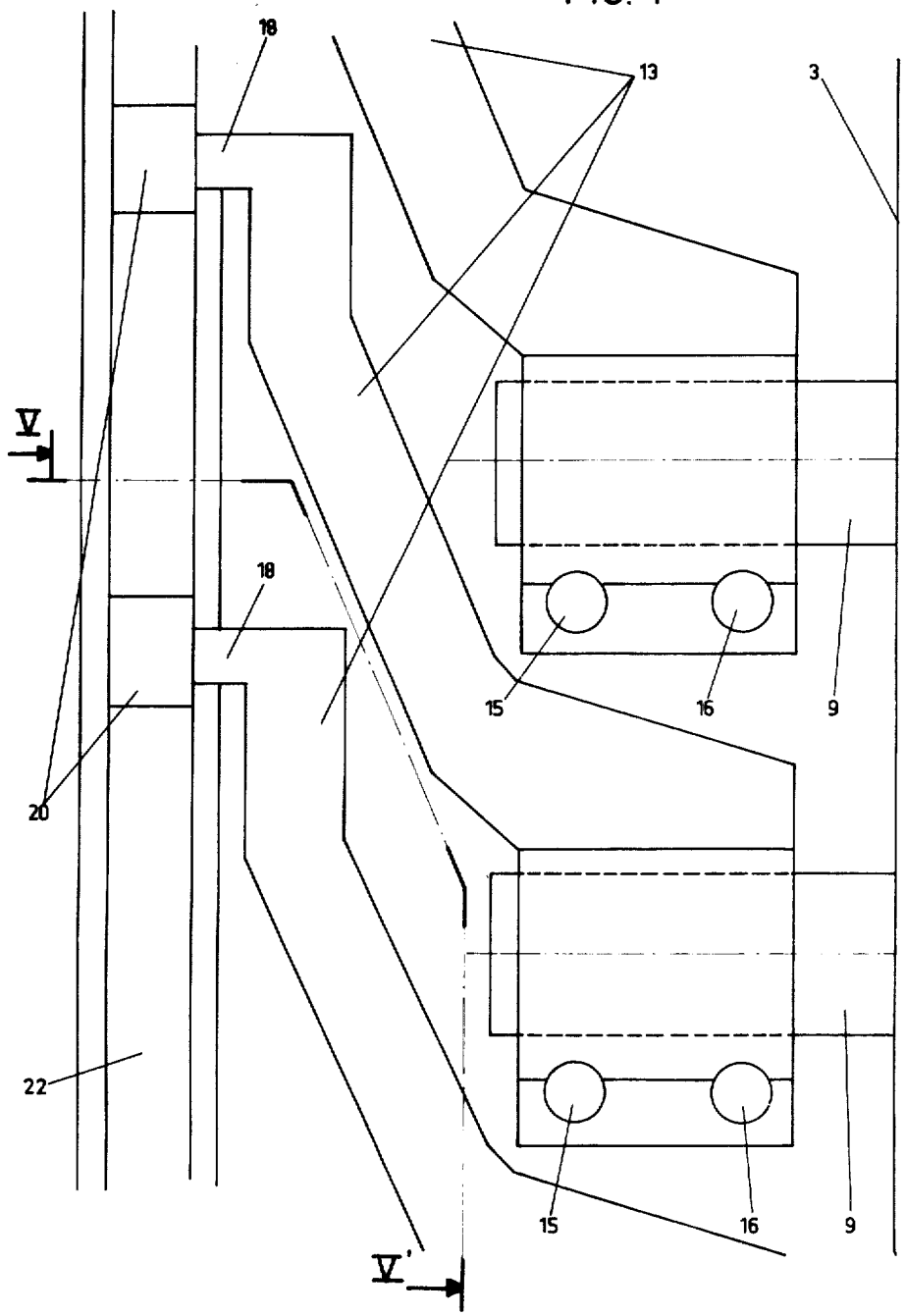
FIG. 4 is an overhead view of the arms of FIG. 3.
Figure 5:
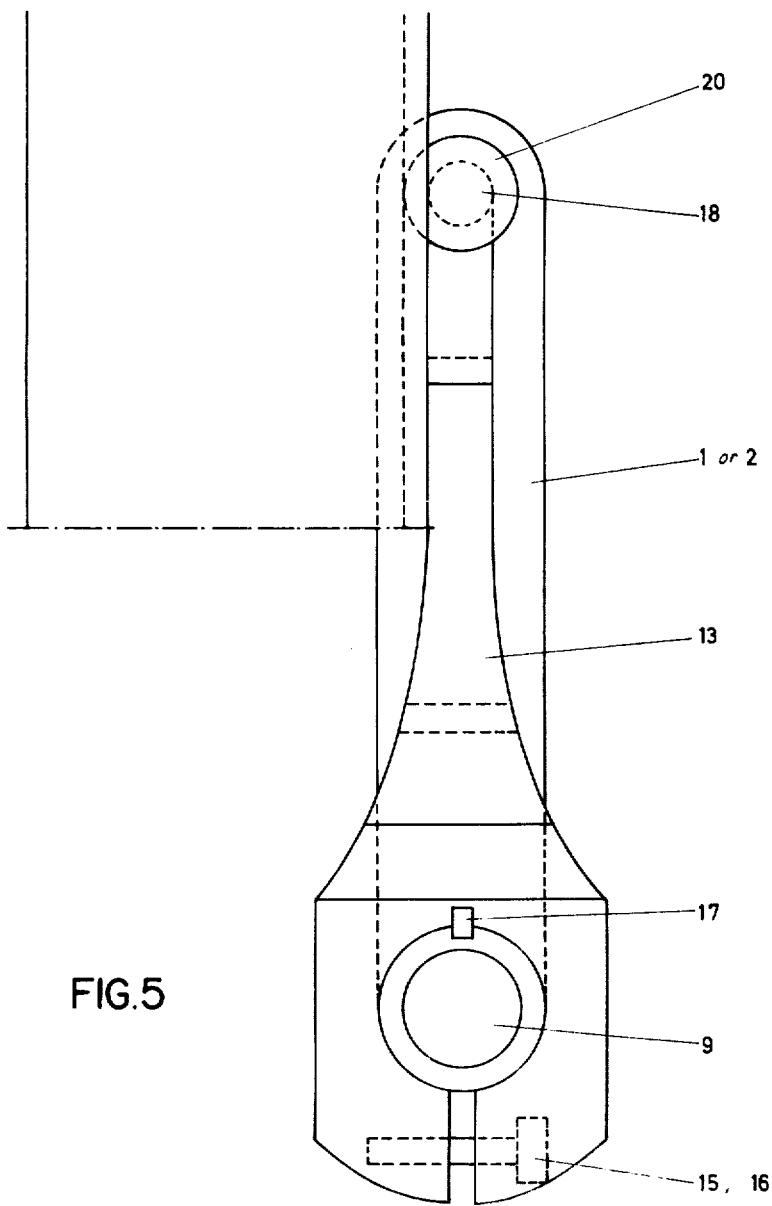
FIG. 5 is a sectional view along the line V—V' of FIG. 4.

FIG. 2 is a perspective view of the curved rods and of the means for controlling their inclination. This figure shows curved rods such as 1 or 2, the beams 3 hinged at the input of the curving station about the axis 6, and the beams 4 supported by the jack 7 and 8 and hinged to the beams 3. Each curved rod has two aligned end sections 9, 10 forming an axle and rotatably mounted in roller bearings 11 and 12 provided on each of the beams 3 in zone A, and on each of the beams 4 in zone B. These bearings are regularly spaced over the entire length of the beams 3 and 4. After passing through the bearings 11 or 12, at least one end 9, 10 of the curved rod is fitted in the socket of a crank arm 13. As shown in FIGS. 3, 4 or 5, to facilitate disassembly the socket of the crank may be bifurcated and fastened to the end section of the curved rod by means of bolts 15, 16 and a key 17 (FIG. 5), or other gripping means.

Each crank arm has at its other end, an axle 18 parallel to the axis passing through the two ends 9 and 10 of a curved rod, about which rotates a roller 20. The rollers 20 all roll on a lateral guide 22 which is horizontal and stationary and is adjacent the point at which the oven or the upstream device of the curving station supplies the sheet to be curved.

The elements relating to a curved rod, such as 1 or 2 i.e., the curved rod itself, the crank arms 13 at their ends, the axles 18 supported by each crank arm, are all situated in the same plane designated by "P" in FIG. 2. This plane is transverse with respect to the direction of advancement of a sheet in the course of the curving operation, and its angle of inclination with respect to the horizontal may be varied by pivoting it about the axis passing through its aligned ends 9 and 10.

The effective length of a crank arm 13, i.e., the distance separating the axis passing through the aligned ends 9 and 10 of a curved rod from the axle 18 bearing the roller 20, is equal to the height of the curved rod, that is, the distance from the peak of the curved rod to its axis of rotation. This is particularly visible in FIG. 5. This figure shows an arm 13 with its head tightened on the end 9 of a curved rod and the axle 18 at the end of the arm bearing roller 20. Behind the crank arm is a curved rod 1 or 2. As will be apparent, the center of axle 18 is in alignment with the center of the peak portion of the curved rod.

The other ends 10 of the curved rods 1, 2 may be provided with crank arms similar to those at ends 9, and a second fixed guide provided on the other side of the apparatus which is similar to guide 22 and in the same plane.

For operation, the apparatus is first adjusted to yield the desired degree of curvature. This is effected by actuating the four jacks 7, 8. If, by actuating these jacks, the two beams 4 are simultaneously lowered, the inclination of the two beams 3 with respect to the horizontal will be increased, beams 3 pivoting about the fixed axis 6 passing through their upper ends. The pivoting axis 5 (FIG. 1) slides horizontally to accommodate this movement. Accordingly the axes of rotation of the ends 9, 10 of the curved rods will be progressively lowered, together with the heads of the crank arms. Since the crank arms 13 have a fixed length, they are obliged to adopt a more vertical position, and their rollers 20 roll on the horizontal guide path 22.

The bearing 11, 12 of the left-most curved rod 1 are lowered very slightly, and the adjustment of the respective crank arm is also very slight. Thus the angle of inclination of rod 1 is changed very little. In contrast, the bearings of the curved rod 2, and similarly the bearings of all the rods in zone B, are lowered much more and consequently their angles of inclination are changed to a much greater extent. The inclination of the curved rods located between rods 1 and 2 are progressively changed by intermediate amounts.

As will be understood, the overall effect of the operation described, wherein beams 4 are lowered, is to increase the convexity of the curved bed. If the beams 4 are raised, the convexity of the curved bed is decreased.

Irrespective of changes in inclination of the curved rods, as the axles 18 which bear the rollers 20 and the centers of the curved rods at their peaks are always aligned, the peaks of the curved rods always remain at the level of the axles 18, this level being determined by the guide 22.

Accordingly, the degree of curvature of the bed formed by the curved rods can be modified solely by changing the position of the jacks 7 and 8. The shape of the arms 13 should be such as to enable them to be inclined without obstructing one another.

After adjusting the degree of curvature, the inclinations of the curved rods remain fixed during the operation of curving all the sheets in a particular batch which are to be bent to the selected degree of curvature.

In operation, a sheet to be curved advances on a stationary shaping bed formed by the group of curved rods. Inasmuch as the bed in zone A has an increasing curvature profile, for example from the initial plane shape into an elliptical one, the edges of the sheet advancing thereon will gradually sag, the maximum sag being obtained after reaching the curved rod 2.

Since the curving of the glass sheet takes place progressively by allowing its edges to sag onto the progressively lower parts of the curved rods, it is not necessary to raise the temperature of the glass. When the sheet has acquired the degree of curvature provided by the rod 2, the sheet continues to be advanced on the generally cylindrical bed (cylinder having an elliptical section) of the rods in zone B.

By employing crank arms and a guide on only one side of the bed of curved rods, ready access to the rods is provided to facilitate changing the sleeves which encircle the rods, which must be done frequently.

The path which the sheets are to follow need not necessarily be horizontal. It can slope downwards if the guide path is no longer directed horizontally, but slopes downwards.

To enable the devices situated downstream of the curving station to eceive the curved sheets having any form of curvature, it will be desirable for the frames of these devices to be vertically adjustable on jacks, so that they can be aligned with the vertical adjustments of the jacks 7 and 8 controlling the inclination variations of the curved rods, and consequently changes in the curvature. It may be possible to use jacks 7 and 8 to produce this vertical adjustment of the frames of the downstream device, at the same time as they vary the vertical adjustment of the beams 4.

I claim:

1. A process for bending to a predetermined curvature a sheet of material in the plastic state, such as a sheet of glass brought to the softening temperature, on a bed formed by a series of curved rods pivotally mounted in a support structure, which comprises inclining the curved rods at different angles of inclination to form a curved bed with a curvature profile which increases progressively to a curvature corresponding to the predetermined curvature, holding the rods at said angles of inclination to form a fixed curved bed with said increasing curvature profile, and advancing the sheet on said fixed bed in the direction of increasing curvature thereof by a rotationally driven sleeve disposed about at least one of the curved rods.

2. A process according to claim 1 in which said curved rods have the same curvature and the angles of inclination thereof with respect to the horizontal progressively increase in the direction of advancement of the sheet.

3. A process according to claim 1 in which the sheet is advanced beyond said curved bed on a bed having a constant profile formed by a series of similarly curved rods having the same angles of inclination.

4. A process according to claim 3 in which the peaks of the curved rods are oriented upstream with respect to the direction of advancement of the sheet.

5. A process according to claim 1 in which said curved rods form a convexly curved bed.

6. A process according to claim 1 in which said curved rods have the same curvature and the angles of inclination thereof with respect to the horizontal progressively increase in the direction of advancement of the sheet with the peaks of the curved rods lying in a straight line, and in which the sheet is advanced beyond said curved bed on a bed having a constant profile formed by a series of similarly curved rods having the same angles of inclination.

7. Apparatus for bending to a predetermined curvature a sheet of material in the plastic state, such as a sheet of glass brought to softening temperature, which comprises a series of curved rods forming a curved bed for receiving said sheet, a rotationally driven sleeve disposed about at least one of said rods for advancing a sheet along said bed, said rods having aligned end sections forming respective axes of rotation of the rods, and means for holding said rods at different angles of inclination to provide a fixed bed having a curvature profile which increases progressively in the direction of advancement of the sheet to a curvature corresponding to said predetermined curvature.

8. Apparatus according to claim 7 including means for adjusting said angles of inclination.

9. Apparatus according to claim 7 in which the peaks of said curved rods lie in a straight line.

10. Apparatus according to claim 7 in which said curved rods have the same curvature and said different angles of inclination progressively increase with respect to the horizontal in the direction of advancement of the sheet.

11. Apparatus according to claim 7 including a further series of curved rods positioned downstream of said series of rods with respect to the direction of advancement of the sheet, said further series of rods being held at the same angle of inclination to provide a bed having a constant curvature profile corresponding to said predetermined curvature.

12. Apparatus according to claim 7 including adjustable means for simultaneously changing said angles of inclination to change said increasing curvature profile while maintaining the peaks of the curved rods in a straight line.

13. Apparatus according to claim 12 in which said adjustable means includes a pivotably mounted frame, said end sections of the curved rods being mounted in said frame with the axes of rotation thereof disposed in a downwardly extending plane, control cranks affixed with the end sections of said curved rods respectively, fixed reference support means for guiding the ends of the crank arms of said control cranks, and means for changing the inclination of said frame with respct to said reference support means.

14. Apparatus according to claim 13 in which the lengths of said crank arms are equal to the distances of the peaks of the curved rods from said axes thereof.

15. Apparatus according to claim 13 in which said frame is pivotably mounted for rotation about an axis adjacent the end receiving said sheet, and including a second frame pivotably attached to the downstream end of the first-mentioned frame, a further series of curved rods having aligned end sections mounted in said second frame with their axes of rotation disposed in a horizontal plane, further control cranks affixed with the end sections of said further series of curved rods respectively, said fixed reference support means guiding the ends of the crank arms of said further control cranks to maintain said further series of control rods at similar angles of inclination, and means for adjusting the vertical height of said second frame with respect to said reference support means to thereby change said inclination of the first-mentioned frame and change the angles of inclination of said further series of curved rods simultaneously with changes in the angles of inclination of the first-mentioned series.

16. A process for bending to a predetermined curvature a sheet of material in the plastic state, such as a sheet of glass brought to the softening temperature, on a bed formed by a series of curved rods pivotally mounted in a support structure, which comprises inclining the curved rods at different angles of inclination to form a curved bed with a curvature profile which increases progressively to a curvature corresponding to the predetermined curvature, maintaining the peaks of said rods in a straight line, holding the rods at said angles of inclination with the peaks thereof in said straight line to form a fixed curved bed with said increasing curvature profile, and advancing the sheet on said fixed bed in the direction of increasing curvature thereof by a rotationally driven sleeve disposed about at least one of the curved rods.

17. A process according to claim 16 wherein the peaks of said rods are maintained in a straight line which is inclined at an angle of at least ninety degrees from the vertical.

18. Apparatus for curving a sheet of material in a plastic state, such as a sheet of glass brought to a softening temperature, which comprises a series of curved rods having aligned end portions, means for mounting said rods for pivoting about respective axes formed by said aligned end portions, means for simultaneously changing the angles of inclination of said rods while maintaining the peaks thereof in a substantially straight line, means for holding the rods at different angles of inclination to form a fixed bed with an increasing curvature profile and a rotationally driven sleeve disposed about a least one of said rods for advancing the sheet along said fixed bed in the direction of increasing curvature thereof.

19. Apparatus according to claim 18 wherein said mounting means includes a frame, said end portions of said rods being pivotally mounted in spaced apart relation along said frame.

20. Apparatus according to claim 18 wherein said means for changing the inclination of said rods includes means for pivotally mounting said frame, crank means affixed with at least one end portion of each rod and having an arm extending therefrom, fixed elongated guide means for guiding the ends of said crank arms therealong, and means for changing the inclination of said frame with respect to said guide means.

* * * * *